United States Patent
Malsbury et al.

[11] Patent Number: 6,085,929
[45] Date of Patent: Jul. 11, 2000

[54] STUD TENSIONING DEVICE FOR FLANGE COVER

[75] Inventors: Allen S. Malsbury, Parsippany, N.J.; Ronald T. Myszka, Bethlehem; Joseph Kalinosky, Allentown, both of Pa.; Richard Klick, Bedminster, N.J.

[73] Assignee: Foster Wheeler USA Corporation, Clinton, N.J.

[21] Appl. No.: 09/170,191

[22] Filed: Oct. 13, 1998

Related U.S. Application Data

[60] Provisional application No. 60/062,831, Oct. 22, 1997.

[51] Int. Cl.[7] .................................................. B65D 45/00
[52] U.S. Cl. .......................... 220/328; 220/315; 220/327; 220/260; 292/138; 292/164; 49/149; 49/324
[58] Field of Search ..................................... 220/315, 260, 220/327, 328; 292/164, 138; 49/149, 324

[56] References Cited

U.S. PATENT DOCUMENTS

| | | |
|---|---|---|
| 1,055,629 | 3/1913 | Grant et al. . |
| 2,734,824 | 2/1956 | DeLuca . |
| 2,804,159 | 8/1957 | Gavito ................................. 70/264 X |
| 3,774,787 | 11/1973 | Ledinsky . |
| 3,830,536 | 8/1974 | Frisch et al. . |
| 3,860,491 | 1/1975 | Baird et al. . |
| 4,086,231 | 4/1978 | Ikio . |
| 4,295,773 | 10/1981 | Dhondt . |
| 4,726,109 | 2/1988 | Malsbury et al. . |
| 4,820,384 | 4/1989 | Pechacek . |
| 4,952,284 | 8/1990 | Becker . |
| 4,960,358 | 10/1990 | DiGiacomo et al. . |
| 5,048,876 | 9/1991 | Wallskog . |
| 5,221,019 | 6/1993 | Pechacek et al. . |
| 5,228,825 | 7/1993 | Fruchtbaum et al. . |
| 5,290,072 | 3/1994 | Pechacek . |
| 5,336,375 | 8/1994 | Wallskog et al. . |
| 5,445,469 | 8/1995 | Huck et al. . |
| 5,500,094 | 3/1996 | Fruchtbaum et al. . |
| 5,556,515 | 9/1996 | Giunta et al. . |
| 5,918,756 | 7/1999 | Morgan ................................. 220/263 |

FOREIGN PATENT DOCUMENTS

| | | |
|---|---|---|
| 1 874 985 | 7/1963 | Germany . |
| 93/19315 | 9/1993 | WIPO . |

*Primary Examiner*—Stephen K. Cronin
*Attorney, Agent, or Firm*—Fitzpatrick, Cella, Harper & Scinto

[57] ABSTRACT

A mechanism for selectively securing a cover to a flange of a pressure vessel. The cover and flange each have openings that are aligned when the cover is in position facing the flange. The mechanism includes an anchor plate having a hole therethrough. A piston is slidable in a direction normal to the cover in alignment with the opening therethrough. A stud extends from to the piston with a stud head remote from the piston. The stud head fits through the opening of the closer of the cover and flange and through a wider portion of the anchor plate hole, and is positioned opposite the flange and cover from the piston when the cover is positioned over the flange. The stud head does not fit through a narrower portion of the anchor plate hole. A resilient member biases the piston away from the cover. A selectively activated actuator overcomes the resilient member and forces the stud head away from the flange and the anchor plate. The anchor plate moves between (i) a locking position, in which the narrower portion of the hole is aligned with the openings so that the resilient member can bias the stud head against the anchor plate, and (ii) an unlocked position, in which the wider portion of the hole is aligned with the openings so that the resilient member can bias the stud head into the enlarged portion of the anchor plate hole.

34 Claims, 8 Drawing Sheets

| BOTH LATCHING CONTROL VALVES SHALL BE ELECTRICALLY LOCKED-OUT UNTIL THE FOLLOWING IS TRUE: | |
|---|---|
| INLET & OUTLET SPx VALVES | CLOSED |
| SWITCH VALVE | SWITCHED |
| TOP HEAD | OPEN |
| DRUM TEMPERATURE | LOW |
| DRUM PRESSURE | LOW |
| CLAMPING PRESSURE | HIGH |

FIG. 7B

STUD TENSIONING DEVICE FOR FLANGE COVER

This application claims the benefit of the U.S. Provisional Application No. 60/062,831, filed Oct. 22, 1997.

FIELD OF THE INVENTION

This invention relates to pressure vessels, and more particularly, relates to a stud tensioning device for securing a cover to a flange of such a vessel.

BACKGROUND OF THE INVENTION

Many industrial processes, such as coking processes or chemical treatment processes, employ large pressure vessels, often disposed vertically with top and bottom closure mechanisms. The bottom closure usually includes a cover that is generally quite massive and secured to the vessel by dozens of bolts. In order to remove the bottom cover from the vessel (a process sometimes referred to as "unheeding" the vessel), the bottom cover is generally first supported by a hydraulic lifting mechanism, then disengaged from the vessel, at which point it can be lowered by the hydraulic mechanism. The operation is reversed to resecure the cover in place. The disengagement and reengagement of the bottom closure can be quite labor intensive, given the mass of the bottom cover and the numerous bolts that hold it in place.

Examples of removable closures are shown in U.S. Pat. Nos. 4,820,384 and 5,290,072, each to Pechacek, and U.S. Pat. No. 5,221,019, to Pechacek et al. For example, the Pechacek '384 patent discloses a remotely operable vessel cover assembly including a cover 10, which can be attached to a flange 5 surrounding an opening in the vessel. When the cover 10 is raised into position, a series of connector pins 60 fits through corresponding holes 20f in a force ring 20 and keyhole-shaped holes 30a in a lock ring 30, which is rotated so that the connector pin heads 60e are locked behind the lock ring 30. Fluid pressure is then applied to a force actuator 40, pressurizing inner and outer annular rings 40a, 40b, which expand to prestress the pins 60 and the cover. A ramp ring 50 is then rotated until a series of ramps 50a firmly contact a complementary series of ramps 10b on the cover 10. The force actuator 40 is then depressurized. According to the Pechacek '384 patent, the angle of inclination of the ramps is sufficiently shallow that friction between the ramp ring 50 and the cover 10 prevents slippage.

The Pechacek '384 patent does show a mechanism for facilitating engagement and removal of the cover. Rather than individually tightening and loosening a large number of bolts, connector pins are selectively locked behind an anchor plate. However, the mechanism disclosed in this patent is complex. For example, in order to secure the cover, the mechanism requires first setting the anchor plate in position behind unstressed pins, then stressing the pins by means of a complex pressure ring assembly, and then utilizing a separate ramp ring to support the pins once they are stressed.

Another example, U.S. Pat. No. 5,228,825, to Fruchtbaum et al., discloses a pressure vessel closure device in which a vessel V is equipped with a head assembly A, which includes a lower flange F at an opening into the vessel V. A generally circular bottom head H (blind flange) is secured against the flange F for A sealing the vessel V with a suitable gasket. In normal use, the vessel V is sealed by a plurality of springs 14 and hooks 12. The hooks 12 anchor a movable retaining element 10 to the bottom head H. The springs 14 bias the retaining element 10 away from the flange F to tension the hooks 12 to seal the bottom head H against the flange F.

In the '825 patent, a plurality of cylinders 30 are disposed to draw the movable retaining element 10 downwardly toward the flange F. Before the bottom head H is attached, the hooks 12 are spread, as shown in FIG. 7 of that patent. The cylinders 30 are pressurized to compress the springs 14, the bottom head H is raised to engage the flange F, and the hooks 12 are then pivoted inwardly below forks 36. The cylinders 30 are depressurized, and the springs 14 then bias the retaining element 10 upwardly from the flange F, and the hooks 12, in turn, engage the forks 36 and securely hold the bottom head H in place against the flange F.

Rather than traditional bolts or pins, the device of the '825 patent utilizes hooks and forks in combination with an axially movable retaining element. The described device also requires that each of the hooks be pivoted in order to engage them behind or disengage them from the forks.

Similarly, U.S. Pat. No. 2,734,824, to DeLuca, shows an autoclave or pressure vessel that includes a vertically disposed tank 10 having a bottom cover. A plurality of bolts 46 are spaced about the tank 10 and arranged to engage a cover 13 when the cover 13 is closed. Each bolt 46 is threadably secured at its upper end to a bifurcated member 47 and has a shoulder 48 which rests tightly against the lower surface of the member 47. Corresponding to each bolt is a radial slot 61' in the edge of the cover and a slot 61 in a flange 65 of the tank. The lower end of each bolt 46 is provided with a nut 59 and washer 60 to engage the underside of the cover 13. Cylinders 49 function to move their respective bolts downwardly, and a series of cams 56 cooperate to swing the bolts outwardly to disengage the bolts from the cover and flange to permit opening of the cover 13.

The bolts 46 in the '824 patent, while providing the basic means for holding the cover 13 in position, would not, according to that patent, prevent accidental opening of the cover 13 should the hydraulic pressure on cylinders 49 fail. In order to avoid such an occurrence, a locking ring 64 is provided on top of the flange 65. The upper shoulder 48 of each bolt 46 is spaced slightly above the top surface of the locking ring 64 when the cover 13 is locked closed. The ring 64 has a plurality of rectangularly shaped cut-out portions 66, and one edge of each of these cut-out portions 66 is provided with a narrow slot 67. The ring 64 can be rotated to a locked position in which the slot 67 engages the body of the bolt 46 and is aligned with its upper collar 48, as shown in FIGS. 4 and 5 of the '824 patent. On the other hand, each member 47 may be aligned with its associated cut-out portion 66 when the cover 13 is to be opened.

The apparatus shown in the '824 patent utilizes a relatively complex mechanism that requires the bolts to be pivoted to be seated and unseated. Further, the same hydraulics that actuate the pivoting must also bear the downward force on the bolts when the tank is sealed. Thus, the locking ring must be employed separately to guard against accidental opening in the event of hydraulic failure.

Thus, there is a need in the art for a mechanism that selectively and reliably secures a cover to a flange of a pressure vessel, which can be simply and efficiently engaged and disengaged. There is a further need for such a mechanism that is conducive to remote actuation. There is a still further need for such a mechanism that does not rely on hydraulic pressure to maintain the engagement.

SUMMARY OF THE INVENTION

Our invention addresses the foregoing needs in the art by providing a stud tensioning device that selectively secures a cover to a flange of a pressure vessel. A plurality of such devices can be employed, using a plurality of studs that extend through matching openings in the flange and cover. A movable anchor plate or plates, also with holes through which each stud extends, is disposed adjacent to the flange or cover. The head of each stud will fit through its associated hole of the anchor plate only if the anchor plate is properly oriented. A piston at the opposite end of the stud can be actuated to force the stud through the openings so that the stud head is spaced from the flange and cover. This permits the anchor plate to be oriented so that when the piston is allowed to return, a resilient member biases the stud head against the anchor plate to clamp the flange and cover together.

In one aspect, this invention relates to a mechanism for selectively securing a cover to a flange of a pressure vessel. The cover and flange each have at least one opening therethrough, the respective openings being aligned when the cover is in position facing the flange. The mechanism includes an anchor plate movably supported by the vessel adjacent to the flange. The anchor plate has a hole therethrough, the hole having a wider portion and a narrower portion. The anchor plate is movable between a first position, in which the narrower portion of the hole is aligned with the openings of the cover and flange, and a second position, in which the wider portion of the hole is aligned with the openings of the cover and flange. At least one piston is secured to the cover so as to be slidable in a direction normal to the cover in alignment with the opening therethrough. A stud extends from the piston and has a stud head remote from the piston so that the stud head is positioned on an opposite side of the flange and cover from the piston when the cover is in position facing the flange. The stud head is sized to fit longitudinally through the opening of at least a one of the cover and flange that is closer to the stud head and through the wider portion of the hole of the anchor plate. The stud head is sized not to fit longitudinally through the narrower portion of the hole of the anchor plate. A resilient member biases the piston away from the cover so as to bias the stud head toward the flange. A selectively activated actuator overcomes the bias of the resilient member and forces the piston toward the cover so that the stud head is moved away from the flange and the anchor plate. Positioning means is provided for selectively moving the anchor plate between the first position, so that deactivating the actuator permits the resilient member to bias the stud head against the anchor plate to clamp the cover and flange together, and the second position, so that deactivating the actuator permits the resilient member to bias the stud head into the wider portion of the anchor plate hole so that the cover and flange can be separated by passing the stud head through the opening of the closer one of the cover and flange.

The selectively activated actuator can include a stud-biasing hydraulic cylinder, in which the piston is slidably mounted, and means for introducing hydraulic fluid into the hydraulic cylinder. The resilient member can be a spring washer adjacent to the piston and through which the stud extends, the spring washer being disposed so as to be compressed when the piston is forced toward the cover. The anchor plate can be substantially annular and rotatable about the pressure vessel between the first and second positions. The positioning means can include a plate-positioning hydraulic cylinder secured to the anchor plate.

The respective openings of the cover and flange can comprise matching pluralities of openings; the anchor plate hole can comprise a corresponding plurality of holes; and the stud can comprise a corresponding plurality of studs. In this case, the at least one piston can comprise plural pistons, a respective one of the studs being secured to a different one of the pistons. The selectively activated actuator can include a piston actuator that simultaneously engages more than one of the pistons. In one embodiment, the anchor plate and the piston actuator are substantially annular, and the piston actuator simultaneously engages all of the plural pistons.

In another aspect, this invention relates to a mechanism for selectively securing a cover to a flange of a pressure vessel. The cover and flange each have at least one opening therethrough, the respective openings being aligned when the cover is in position facing the flange. The mechanism includes a stud having a shank and a stud head at an end of the shank, the stud head being larger in cross section than the shank and sized to fit longitudinally through the opening of at least one of the cover and flange. At least one piston is disposed at an opposite end of the shank of the stud from the stud head, the piston being slidable substantially normal to the cover and flange and located so that the stud head and the piston are disposed on opposite sides of the cover and flange when the cover is positioned facing the flange, with the stud head being closer to the at least one of the cover and flange through which it fits. An anchor plate is disposed opposite to the cover and flange from the piston and has a hole therethrough into which the stud extends when the cover is positioned facing the flange, the hole having (i) a wider portion through which the stud head can pass longitudinally and (ii) a narrower portion through which the stud head cannot pass longitudinally. The anchor plate is movable between a first position, in which the narrower portion of the hole is aligned with the openings of the cover and flange, and a second position, in which the wider portion of the hole is aligned with the openings of the cover and flange. A resilient member biases the piston away from the cover and flange so as to bias the stud head toward the cover and flange. A selectively activated actuator is provided for overcoming the bias of the resilient member and forcing the piston toward the cover and flange so that the stud head moves away from the cover, the flange, and the anchor plate. Positioning means is provided for selectively moving the anchor plate between (i) the first position, in which deactivating the actuator permits the resilient member to bias the stud head against the anchor plate to clamp the cover and flange together, and (ii) the second position, in which deactivating the actuator permits the resilient member to bias the stud head into the wider portion of the anchor plate hole so that the cover and flange can be separated by passing the stud head through the opening of the at least one of the cover and flange.

Another aspect of the invention relates to a mechanism for selectively securing a cover to a flange of a pressure vessel. The cover and flange each have an opening therethrough, the respective openings being aligned when the cover is in position facing the flange. The mechanism includes a stud having a shank and a stud head at one end of the shank. The stud head is larger in cross section than the shank and is sized to fit longitudinally through the opening of at least one of the cover and flange. The stud is positionable with the stud head to a one side of the cover and flange closer to the at least one of the cover and flange through which it can fit, and the shank extends from the other side of the cover and flange. An anchor plate is disposed on the one side of the cover and flange and has a hole therethrough into which the stud extends. The hole has (i) an enlarged portion through which the stud head can fit longitudinally and (ii) a narrowed portion through which the stud head cannot fit longitudinally. The anchor plate is movable between a first position, in which the narrowed portion of the hole is aligned with the openings of the cover and flange, and a second position, in which the enlarged portion of the hole is aligned with the openings of the cover and flange. A piston is disposed on the other side of the cover and flange at an end of the stud shank opposite from the stud head, the piston being selectively actuated to force the stud head away from the cover, the flange, and the anchor plate. A resilient member biases the piston away from the cover and flange so as to move the stud head toward the cover and flange when the piston is not actuated. A drive mechanism selectively moves the anchor plate between (i) the first position, in which the resilient member moves the stud head tightly against the anchor plate to clamp the cover and flange together when the piston is not actuated, and (ii) the second position, in which the resilient member moves the stud head into the enlarged portion of the hole of the anchor plate when the piston is not actuated so that the cover and flange can be separated by passing the stud head through the opening of the at least one of the cover and flange.

A further aspect of the invention relates to a mechanism for selectively securing a cover to a flange of a pressure vessel. The cover and flange each has a series of openings therethrough, the openings of the cover being aligned with the openings of the flange when the cover is in position facing the flange. The mechanism includes an annular anchor plate rotatably supported by the vessel adjacent to the flange. The anchor plate has a series of holes therethrough, the holes each having a wider portion and a narrower portion. The wider portions and the narrower portions are alternately alignable with the openings through the cover and flange. A plurality of pistons are each mounted so as to be slidable in a direction substantially normal to the cover in alignment with a different one of the openings through the cover. A plurality of studs is provided, and each extends from a different one of the pistons, and each has a stud head remote from the piston so that the stud heads are positioned opposite to the flange and cover from the pistons when the cover is in position facing the flange. The stud heads are sized to fit longitudinally through the openings of the flange and through the wider portions of the holes of the anchor plate. The stud heads are sized not to fit longitudinally through the narrower portions of the holes of the anchor plate. A plurality of spring washers is provided, each adjacent to one of the pistons and having an associated one of the studs extending therethrough, so as to be compressed when the piston is forced toward the cover. Selectively activated means applies hydraulic pressure to a distal side of each piston so as to force the pistons toward the cover and compress the spring washers so that the stud heads are moved away from the flange and the anchor plate. Positioning means is provided for selectively moving the anchor plate between (i) a first position, in which the narrower portion of each of the holes is aligned with the openings of the cover and flange so that deactivating the hydraulic pressure permits the spring washers to decompress and bias the stud heads against the anchor plate to clamp the cover and flange together, and (ii) a second position, in which the wider portion of each of the holes is aligned with the openings of the cover and flange so that deactivating the hydraulic pressure permits the spring washers to decompress and bias the stud heads into the wider portions of the anchor plate holes so that the cover and flange can be separated by passing the stud heads through the openings of the flange.

These and other objects, features and advantages of the present invention will be more clearly understood from the following discussion with reference to the following drawings, in which like reference numerals refer to like elements throughout.

BRIEF DESCRIPTION OF THE DRAWINGS

FIGS. 7A and 7B are schematic illustrations of a hydraulic control mechanism for use with a flange cover closure mechanism of the present invention.

DETAILED DESCRIPTION OF THE PREFERRED EMBODIMENTS

Figure 1A:
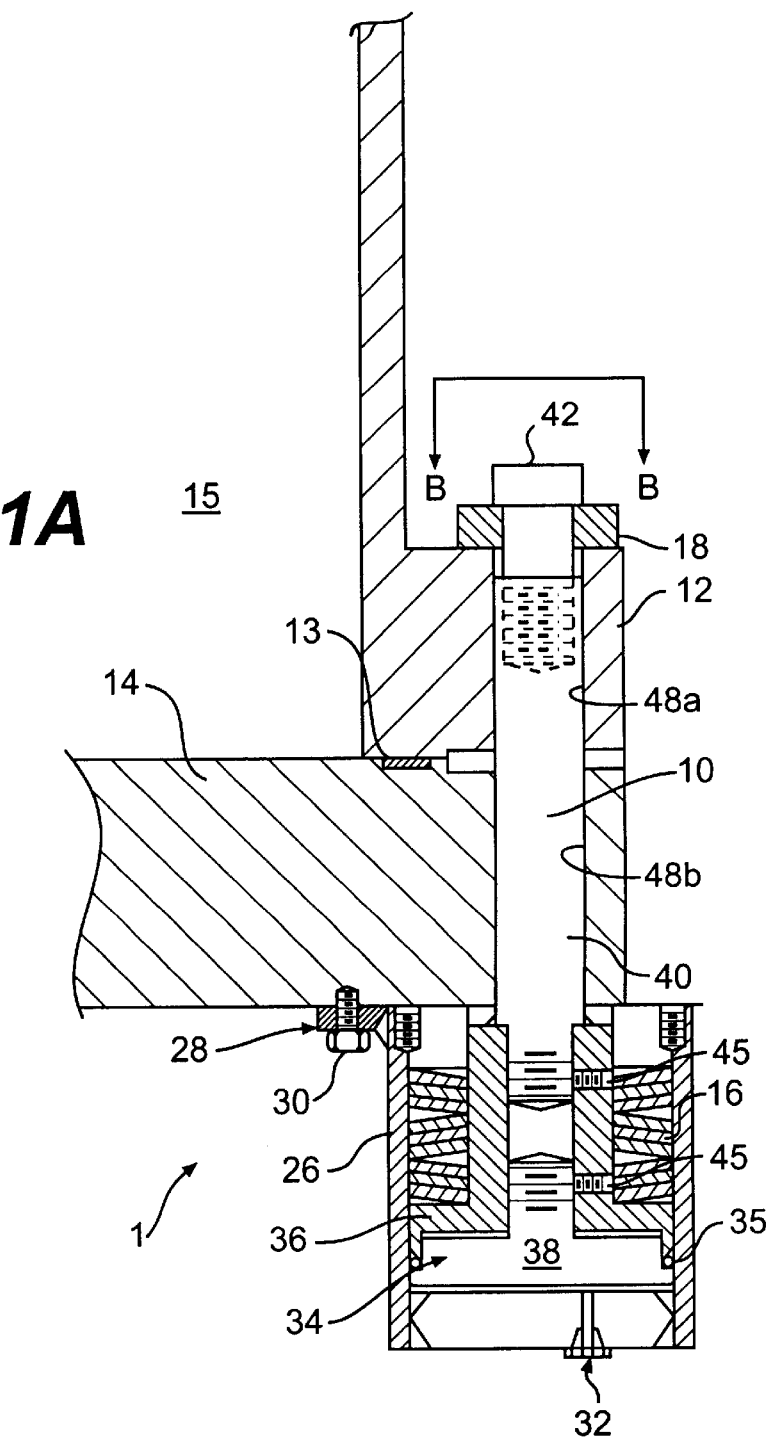
FIG. 1A is a schematic, elevational view of a flange cover closure mechanism according to an embodiment of the present invention.
Figure 1B:
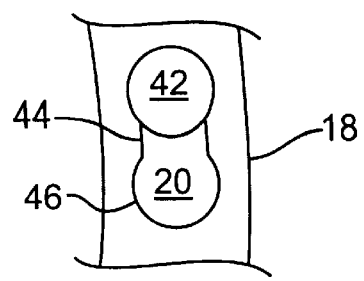
FIG. 1B is a view taken along the line B—B in FIG. 1A.

FIGS. 1A and 1B schematically illustrate a flange cover closure mechanism 1, for closing an opening of a pressure vessel 15, according to an embodiment of the present invention. Around the opening of the pressure vessel is a flange 12 with which a cover 14 mates. Preferably, a gasket 13 seats between the flange and cover. The flange 12 and cover 14 have matching longitudinal openings 48a, 48b, which align when the cover 14 is in position facing the flange 12. A stud extends longitudinally through the matching openings 48a, 48b to hold the flange 12 and cover 14 together as described below.

The stud 10 has a shank 40 with a head 42 at one end thereof. The head 42, which can be either secured to the stud 10 or integrally formed therewith, is larger than the shank 40 in cross section, but small enough to fit through the opening 48a or 48b of at least one of the flange 12 and cover 14, as discussed in more detail below. A piston 34 is located at the other end of the shank 40 of the stud 10. The stud head 42 and the piston 34 are positionable, as shown, on opposite sides of the flange 12 and cover 14.

The piston 34 in the illustrated embodiment is slidably disposed in a hydraulic cylinder 26, which is secured to the underside of the cover 14. The cylinder 26 can be mounted to the cover 14 by a conventional mounting bracket 28 and bolts 30 (only one of which is visible in FIG. 1A), or the like. The piston 34 and cylinder 26 are each preferably formed of a relatively high-strength material such as a low alloy carbon steel. Other suitable materials, such as stainless steel or other high alloy steels, well known in the art, can be substituted.

The piston 34 of the embodiment illustrated in FIG. 1A is of a standard two-piece construction, and includes an upper piece 36 and a lower piece 38 with an O-ring 35 disposed therebetween. In this embodiment, set screws 45 are used to secure the piston to the end of the stud 10, and also to secure together the two pieces 36, 38 of the piston.

A resilient member 16 is provided to bias the piston 34 longitudinally away from the flange 12 and cover 14, so that the stud head 42 is biased toward the flange and cover. In the illustrated embodiment, the resilient member 16 is a spring washer or spring washers disposed within the cylinder between the piston 34 and the cover 14 so that the stud 10 extends therethrough.

In this embodiment, the mechanism 1 is shown with the stud 10 having the stud head 42 oriented toward the flange 12 and the piston 34 toward the cover 14. If desired, this arrangement can be reversed, with the piston 34 being located toward the flange 12 and the stud head 42 toward the cover 14. However, in applications such as coke drum closures, the temperatures near the drum may be quite high. Therefore, if the arrangement were reversed, measures might be necessary to buffer the hydraulic components and the spring washers 16 from the high temperatures.

Regardless of the orientation, the stud head 42 should be sized to fit through the opening 48a or 48b of the one of the flange 12 and cover 14 that is closer to the stud head 42, and an anchor plate 18 is disposed opposite to the flange 12 and cover 14 from the piston 34. The anchor plate 18, which is movable relative to the flange 12 and cover 14, has a hole 20 through which the stud 10 extends. The hole 20 includes at least two different-sized regions that are alternately alignable with the openings 48a, 48b of the flange and cover: a narrowed portion 44, through which the head 42 of the stud 10 cannot fit longitudinally, and an enlarged portion 46, through which the head of the stud can fit longitudinally. The hole 20 can be shaped in any of several ways. In the illustrated embodiment, the hole 20 is key-hole shaped, with a generally circular enlarged portion 46 and a contiguous, elongated narrowed portion 44.

FIGS. 1A and 1B show the anchor plate 18 in a position in which the narrowed portion 44 of the hole 20 is aligned with the stud head 42 and the matching openings, 48a, 48b of the flange 12 and cover 14. The portion of the anchor plate 18 surrounding the narrowed portion 44 of the hole 20 therefore provides a bearing surface for the stud head 42. The anchor plate 18 can be moved so that the enlarged portion 46 of the hole 20 is instead aligned with the stud head 42 and the matching openings 48a, 48b of the flange 12 and cover 14.

In the illustrated embodiment, the piston 34 is actuated by introducing hydraulic fluid into the cylinder 26 through a port 32 at the distal side of the piston 34. This drives the piston 34 toward the flange and cover against the bias of the resilient member—the spring washer 16, in this embodiment, which is compressed by the piston 34. This forces the stud head 42 away from the flange and cover, so as to be clear of the anchor plate 18. When the stud head 42 is so positioned, the anchor plate 18 can be moved relative to the cover 14 and flange 12. The range of motion is constrained by the presence of the shank 40 of the stud 10 within the hole 20.

When the piston 34 is permitted to return under the bias of the resilient member 16 with the anchor plate in the position illustrated in FIGS. 1A and 1B, the mechanism 1 acts to clamp the flange 12 and cover 14 together. Because the anchor plate 18 is positioned so that the narrow portion 44 of the hole is aligned with the openings 48a, 48b, the stud head 42 cannot pass through the hole 20. As the resilient member 16 forces the piston 34 away from the flange 12 and cover 14, the stud head 42 will abut the anchor plate 18, preventing the piston 34 from being moved any further away from the anchor plate. Thus, the force of the resilient member 16 will clamp the flange 12 and cover 14 together, compressing the gasket 13 therebetween.

On the other hand, when the piston is permitted to return when the enlarged portion 46 of the hole 20 of the anchor plate 18 is aligned with the stud head 42, the resilient member 16 draws the stud head into the enlarged portion 46 of the hole. Thus, the flange 12 and cover 14 can be separated by passing the stud head 42 completely through the openings 48a, 48b of the flange 12 and cover 14.

Figure 2:
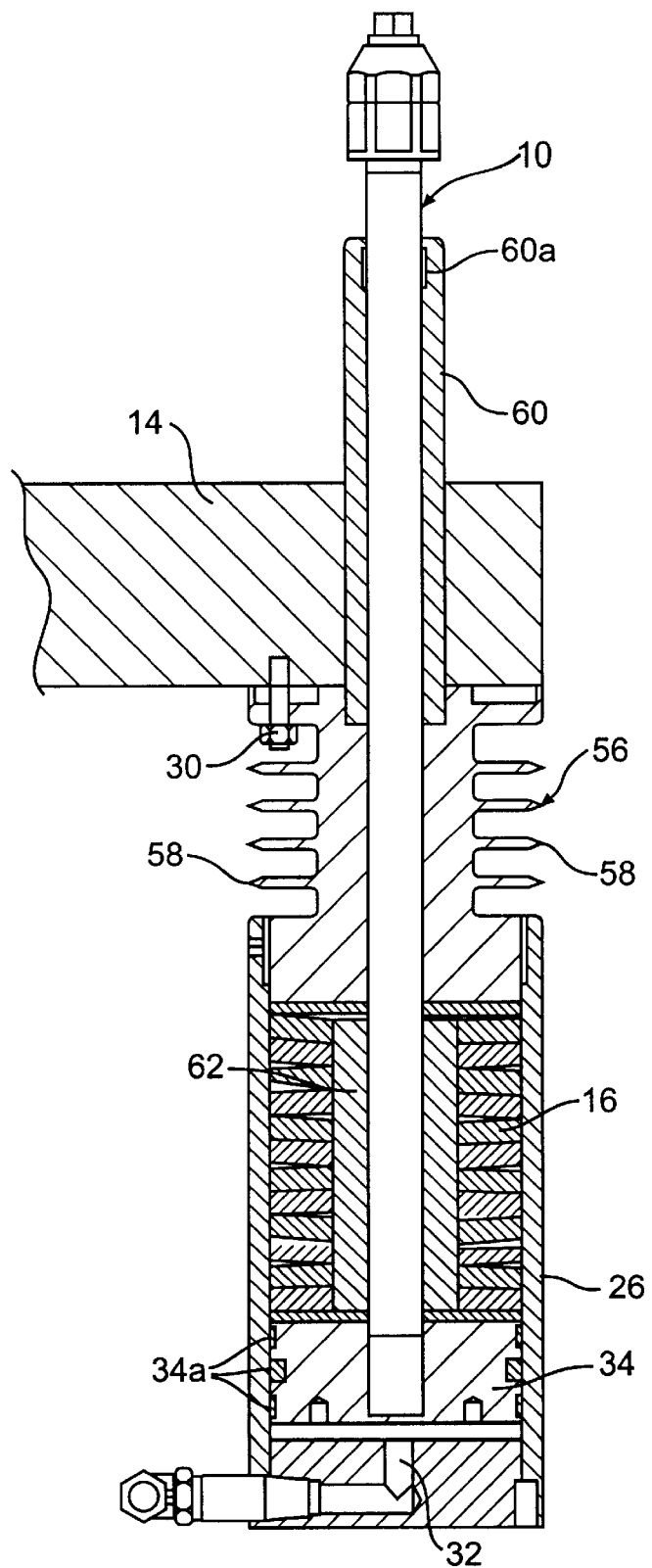
FIG. 2 is a schematic, elevational view of a flange cover closure mechanism according to another embodiment of the present invention.

FIG. 2 illustrates another embodiment of the closure mechanism of the present invention. This figure illustrates the cover 14 and the portions of the mechanism that are secured to the cover 14, which has been separated from the flange of the vessel (the figure omits showing the flange and anchor plate).

A heat sink spacer 56 may be employed between the cover 14 and the cylinder 26 (or between the flange 12 and the cylinder 26, if the orientation of the stud 10 were reversed) of this embodiment. At times during a delayed coking cycle, for example, the cover 14 will reach relatively high temperatures. By employing this heat sink spacer 56, the spring washers 16 and the hydraulic components can be maintained within acceptable temperature ranges. The heat sink spacer 56 may be integrally formed with the cylinder 26 or may be provided as a separate part. It is preferred that the heat sink spacer 56 be formed of an alloy steel (similar to that normally utilized in coke drum blind covers) to provide adequate strength at high temperatures, but other suitable materials, such as low alloy carbon steel or cast iron, may be employed. In this embodiment, the heat sink spacer 56 employs fins 58 to increase surface area and to better dissipate heat. These fins 58 may be arranged longitudinally, circumferentially, or otherwise, or may be omitted altogether.

An optional protective collar 60 can also be employed around the stud 10. This collar 60 can be secured within the opening through the cover 14 and fit through the opening through the flange 12. The collar 60 helps to guide the motion of the stud 10 and protects the sliding surface of the stud 10 when the cover 14 has been removed from the flange 12. The collar 60 protects the stud 10 from mechanical damage, and also spaces the exposed sliding surface of the stud 10 from the surface of the cover 14. Because they do not slide relative to one another, a more effective seal can be formed between the collar 60 and the cover 14 than could be formed between the stud 10 and the cover 14 in the absence of the collar 60. The sliding joint between the stud 10 and the collar 60, on the other hand, is elevated above the surface of the cover 14, where the liquid vessel contents can pool. This helps to reduce the potential seepage of the liquid vessel contents into the mechanism, especially when the cover 14 is removed. A wiper 60a acts as a further barrier against such potentially damaging seepage. This wiper 60a is typically formed of cast iron, but can be formed of graphite, ceramic, mineral fiber, high alloy steel, or the like.

Also shown in FIG. 2 is an optional but preferred loose-guide-and-stop 62 within the cylinder 26. This element guides both the stud bolt 10 and the spring washers 16 as the piston 34 is actuated. The length of the guide 62 in the longitudinal direction may be selected in order to define the limits of movement of the piston 34. As it moves toward the cover 14, the piston 34 will stop when it abuts the guide 62. This limits the degree by which the spring washers 16 can be compressed in each cycle. As will be appreciated by those skilled in the art, this helps to protect the washers 16 against early failure due to repeated high-amplitude compressions.

Both the collar 60 and the guide 62 can be formed of a material such as a low alloy carbon steel, which is fairly high in strength. Many other such materials that are commonly used in machinery design applications, such as cast iron or stainless steel, can be used instead, for either or both.

In the embodiment illustrated in FIG. 2, the piston is of a single-piece construction, as distinguished from the two-piece piston of the FIG. 1A embodiment. In this embodiment, the stud 10 extends all the way into and is secured directly by threaded engagement to the piston 34. As shown, three seals 34a on the periphery of the piston 34 provide a sealed, slidable fit with the interior of the cylinder 26. Of course, if desired, more or fewer seals can be employed.

Figure 3:
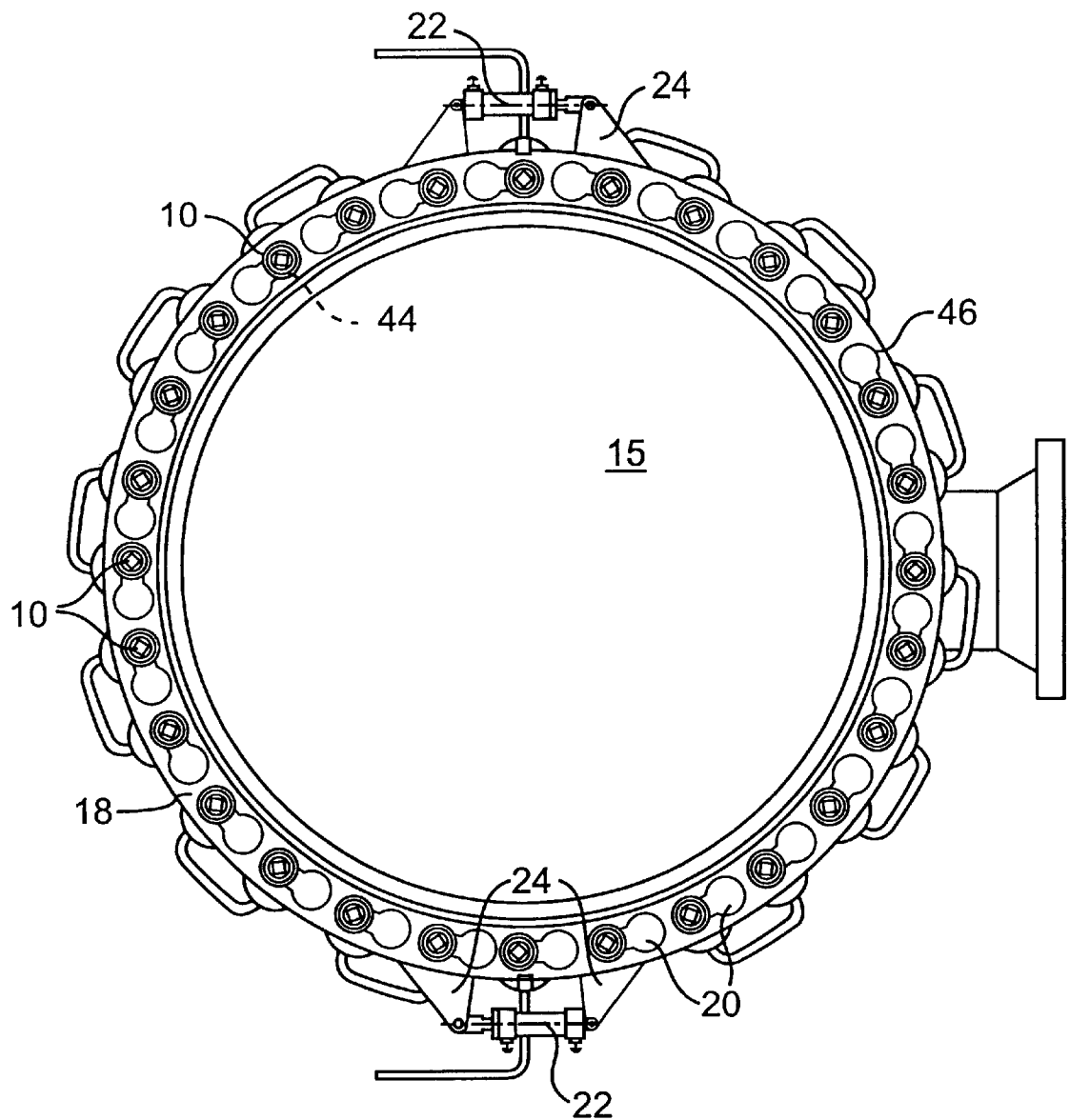
FIG. 3 is a top schematic view of the lower end of a coke drum employing a plurality of flange cover closure mechanisms similar to the mechanism shown in FIG. 2.
Figure 4:
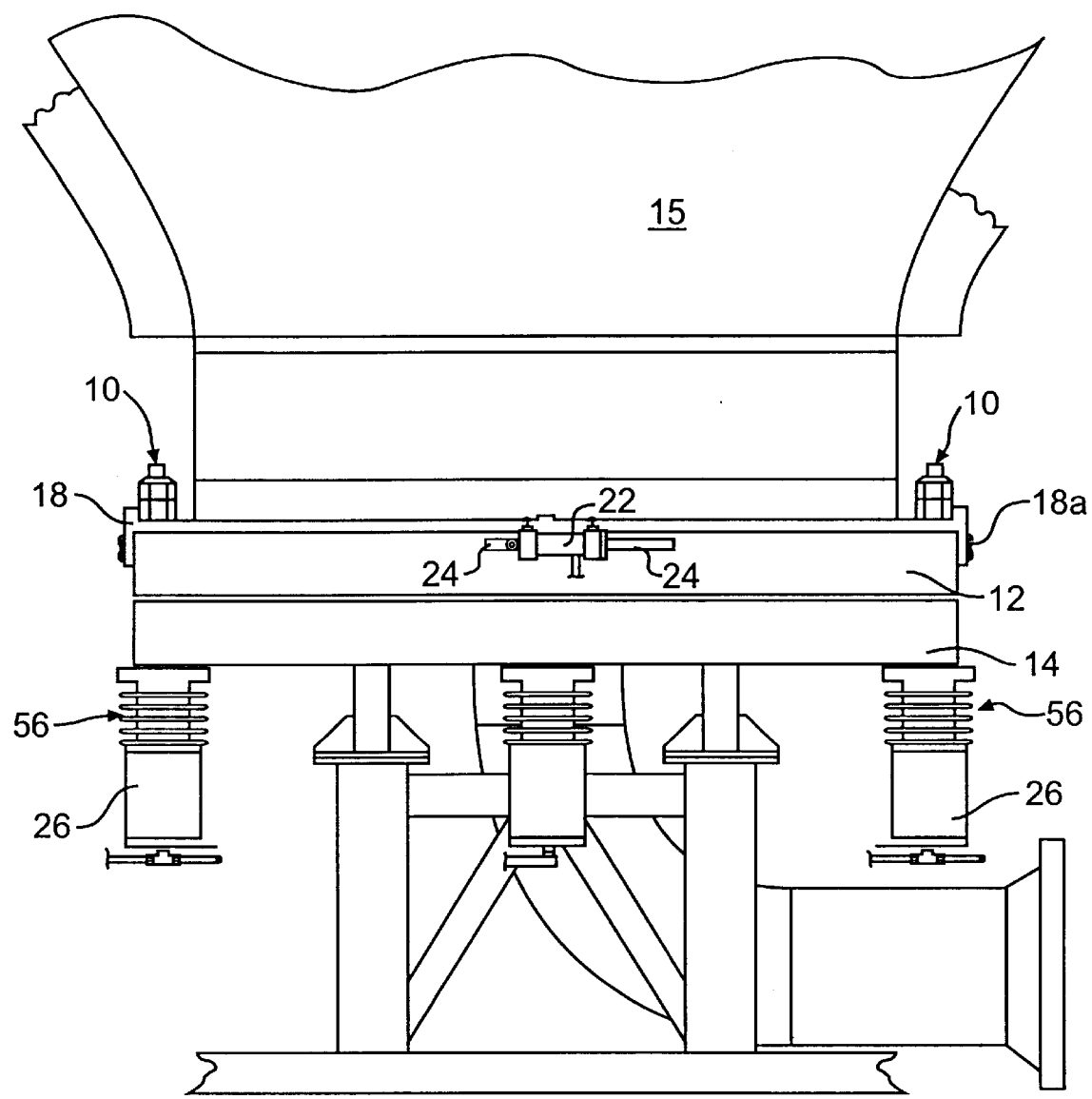
FIG. 4 is a side elevational view of the closure mechanisms and the lower portion of the coke drum shown in FIG. 3.
Figure 5:
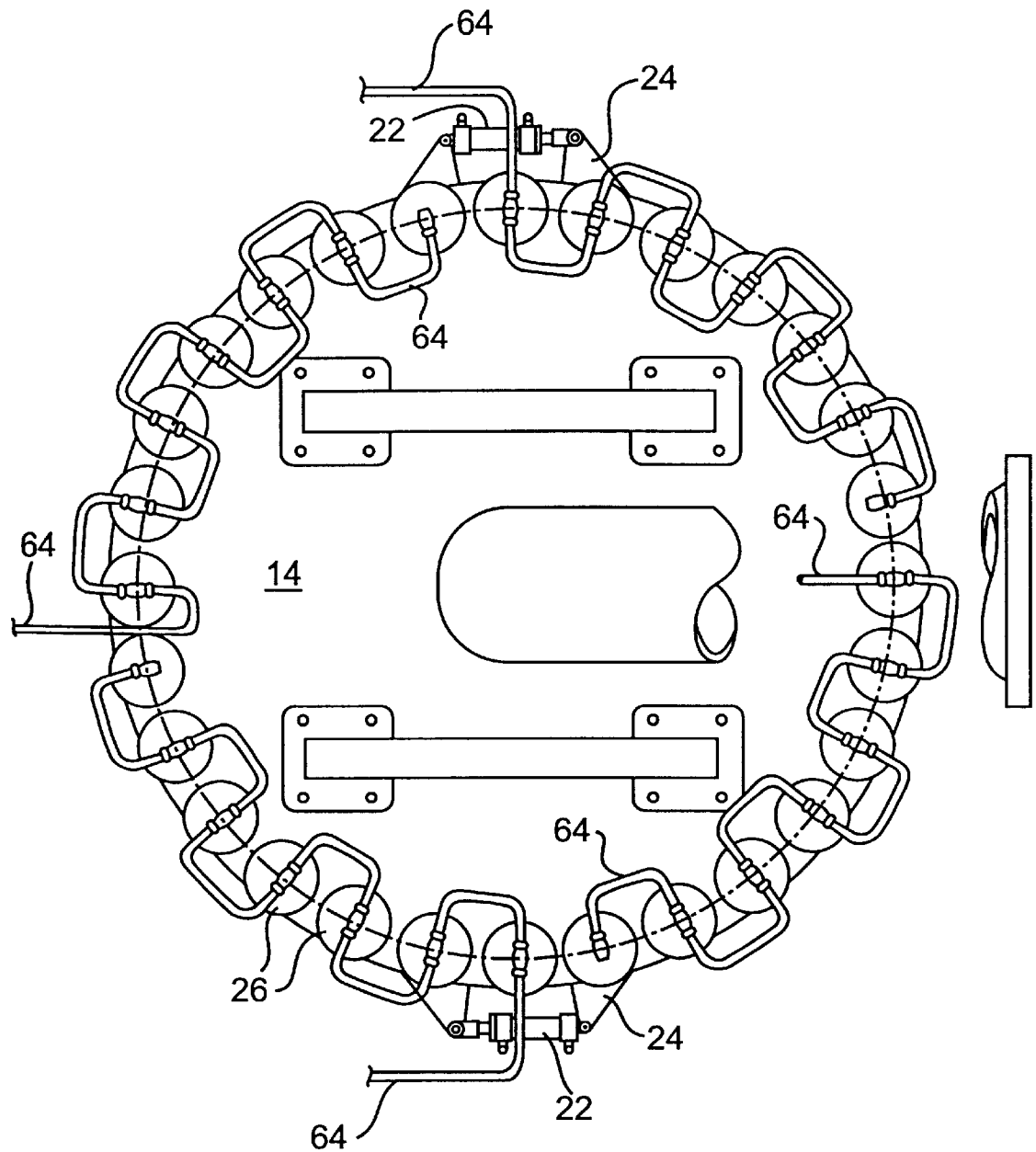
FIG. 5 is a bottom plan view of the closure mechanisms and coke drum shown in FIG. 3.

A plurality of such mechanisms 1 according to any of the above embodiments can be employed to provide, for example, a tight and secure seating of a blind cover to a flange of a coke drum. FIGS. 3–5 show such a blind cover 14 secured to the bottom of a coke drum 15 by a plurality of such mechanisms similar to the embodiment shown in FIG. 2. FIG. 3 is a top schematic view of the lower end of the coke drum. FIGS. 4 and 5 are, respectively, a side elevational and a bottom plan view. FIG. 5 shows four hydraulic lines 64, one each leading to one-quarter of the hydraulic cylinders 26 that actuate the studs 10. Because the hydraulic cylinders 26 are connected in series to the lines 64, there will be a slight delay between successive hydraulic cylinders 26 in the series. Increasing the number of lines 64, and therefore decreasing the number of hydraulic cylinders 26 per line, will minimize the cumulative effect of these delays and result in more synchronous operation of the hydraulic cylinders 26.

The flange 12 and cover 14 each has a series of the openings 48a, 48b, respectively, which are aligned when the cover is in place over the flange. The anchor plate 18 has a matching series of the holes 20, each of which has a narrowed portion 44 and an enlarged portion 46, as discussed above. The narrowed portions 44 and the enlarged portions 46 are alternately alignable with the openings 48a, 48b. This arrangement can be used to remotely and selectively secure the flange 12 to the cover 14, and provides a full, bolted closure once engaged. This device can be combined with standard coke drum unheading equipment to enable simple, complete and remote removal of the coke drum bottom flange cover.

As best seen in FIG. 3, the anchor plate 18 of this embodiment is an annulus rotatable relative to the pressure vessel. The anchor plate 18 can ride directly on the flange 12 as shown, or can ride on bearings. Vertical guides 18a (FIG. 4) can be bolted to the periphery of either the plate 18 or the flange 12 to guide the plate 18 as it moves. The anchor plate of the illustrated embodiment is moved circumferentially between the locking and unlocked positions. FIG. 3 shows the mechanism 1 with the anchor plate 18 in the locking position. This is an advantageous configuration for the anchor plate, given a circular pressure vessel. However, the anchor plate can take other shapes, and multiple anchor plates can be used around the perimeter of the vessel, rather than a single, annular plate. What is important is that the anchor plate 18 (or plates) be movable between a position in which the stud heads 42 lock behind it and a position in which the stud heads 42 can pass through it.

In the preferred embodiment, the anchor plate 18 is moved by at least one hydraulic cylinder 22. It is most preferred to use at least two such cylinders 22, evenly spaced about the periphery of the anchor plate, to rotate the anchor plate 18 in a smooth and reliable manner. In the illustrated embodiment, two (preferably bi-directional) hydraulic cylinders 22 are employed to drive the anchor plate 18 circumferentially. The cylinders 22 can be engaged to the anchor plate directly or by any suitable means, such as extensions 24, which extend from the anchor plate.

Once the anchor plate 18 is in the position illustrated in FIG. 3, the hydraulic pressure in the cylinders 26 can be released, allowing the spring washers 16 to move the pistons 34 away from the flange 12 and cover 14. As discussed, the full force of the spring washers 16 then clamps the flange gasket 13 between the flange 12 and cover 14. In addition, the spring washers 16 impart tension in the studs 10, keeping the flange and cover tightly clamped together and the junction free of leaks. Thus, no hydraulic pressure is necessary to maintain the closure. To release the stud tension and open the closure, each cylinder 26 is pressurized and the anchor plate 18 is rotated so that the enlarged portions 46 of the holes 20 are aligned with the stud heads 42.

Figure 6:
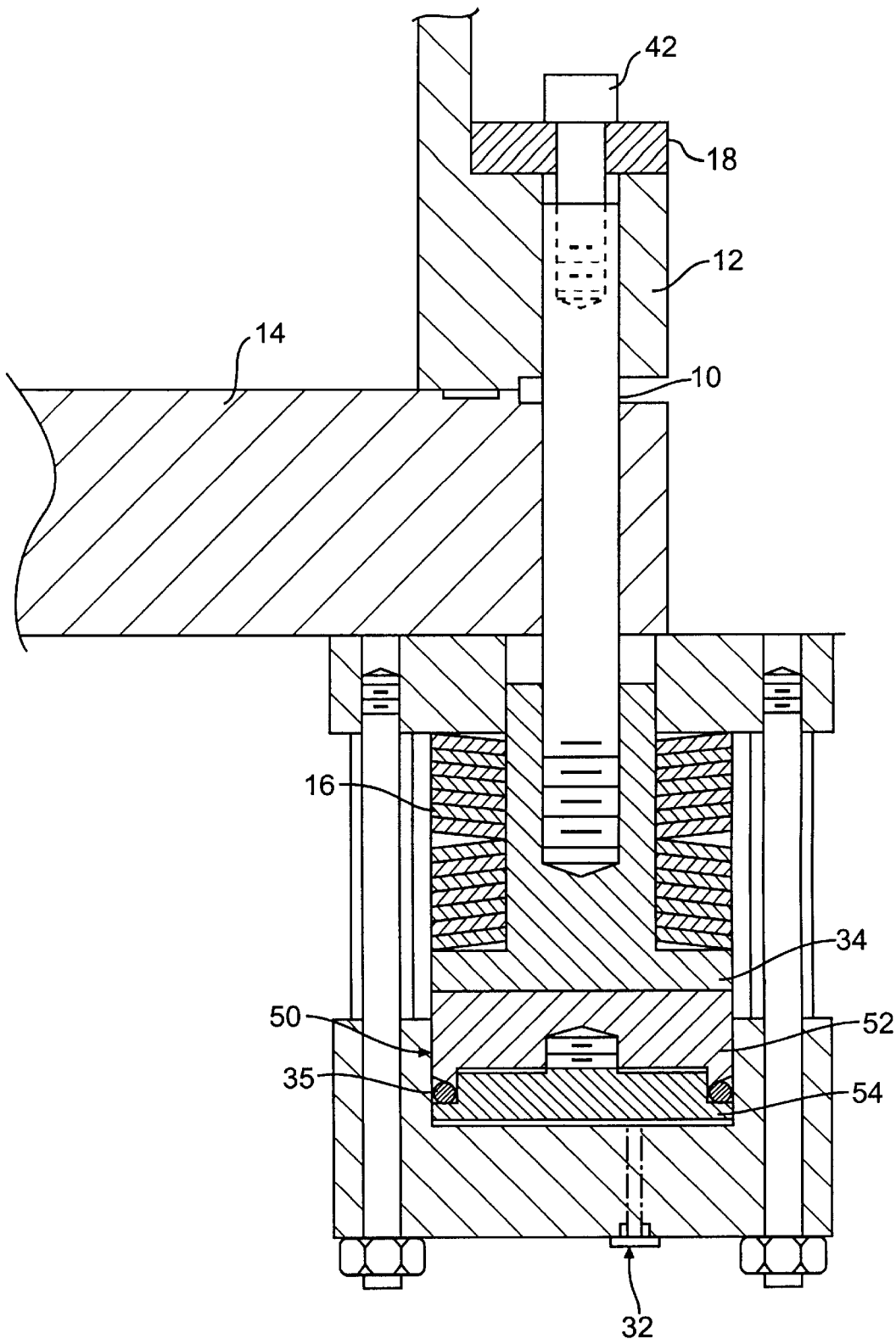
FIG. 6 is a schematic, elevational view of a flange cover closure mechanism according to another embodiment of the present invention.

In the embodiments illustrated in FIGS. 1A and 2, a separate piston-type actuator is employed for each stud 10. Hydraulic fluid is introduced to the cylinder 26 via a line connected to the port 32 at the base of the cylinder. In an alternate embodiment, illustrated in FIG. 6, a single piston actuator 50 can be used to actuate at least two, and preferably all, of the pistons. For example, the piston actuator 50 can be annular to correspond to an annular anchor plate. In the illustrated embodiment, the piston actuator 50 is comprised of an upper piece 52 and a lower piece 54, with an O-ring therebetween. Corresponding to each stud 10 is a separate piston 34. All of the pistons 34 are preferably actuated simultaneously by the same annular piston actuator 50.

Figure 7A:
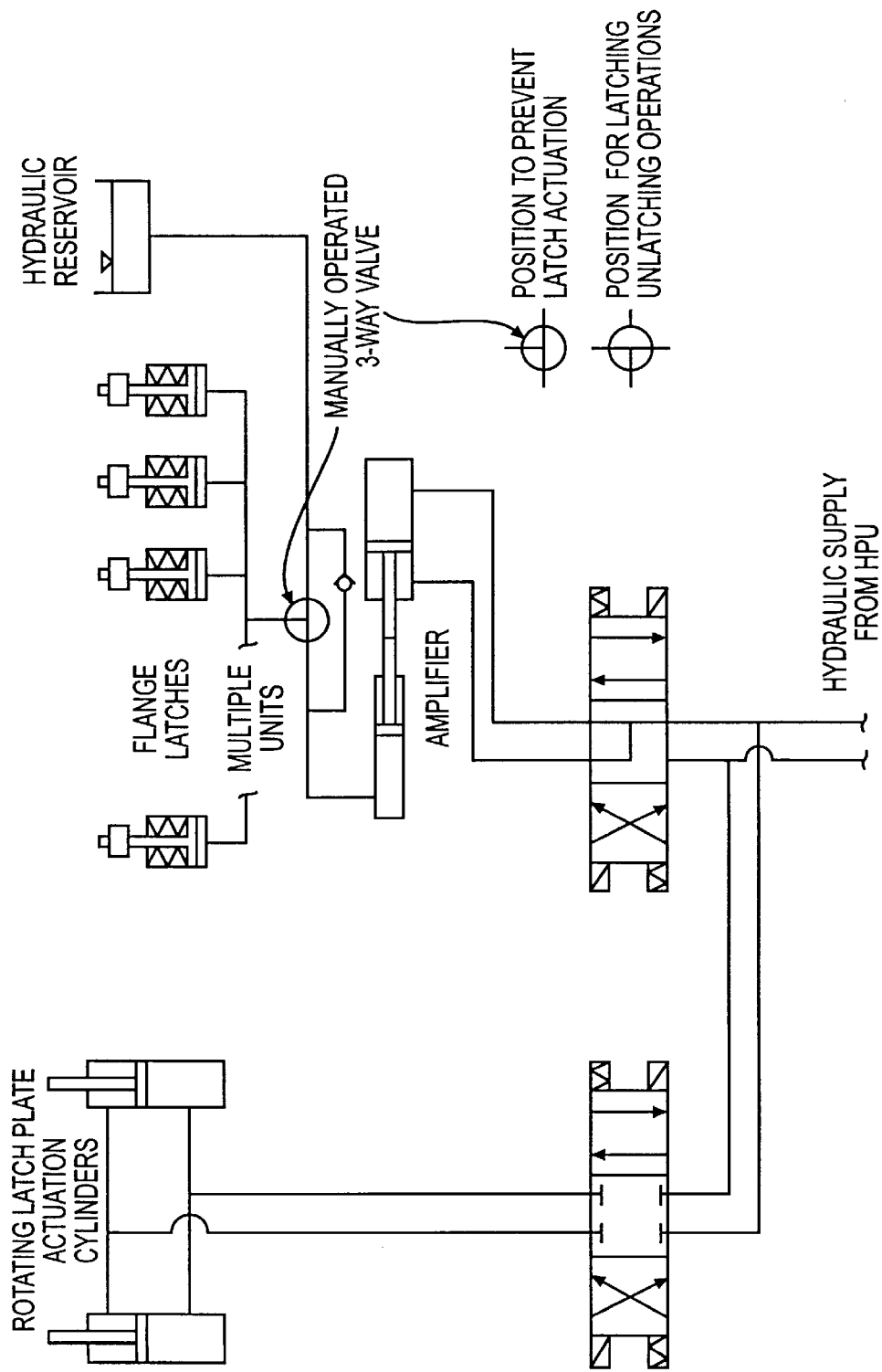

FIGS. 7A and 7B schematically illustrate one approach for utilizing conventional hydraulic equipment to control the fluid pressure needed to actuate the hydraulics of the inventive mechanism. In this approach, a single hydraulic power unit (HPU) and a single hydraulic reservoir are used to control the flow of pressurized fluid throughout the mechanism for a coke drum, in a manner well-known in the art. In a multi-drum delayed coker, the coke drums can each be taken off line individually in order to remove the coke from them. The table shown in FIG. 7B is one example of the control logic that can be used to enable and disable the entire mechanism. Isolation valves "SPx", not shown in FIG. 7A, are used to isolate the individual coke drums of the multi-drum delayed coking system so that they may be opened and the coke removed.

While the present invention has been described with respect to what is at present considered to be the preferred embodiments, it should be understood that the invention is not limited to the disclosed embodiments. To the contrary, as exemplified above, the invention is intended to cover various modifications and equivalent arrangements included within the spirit and scope of the appended claims. For example, rather than employing hydraulic pressure to actuate the pistons 34 and/or move the anchor plate 18, various mechanical drive mechanisms can be used instead, as will be appreciated by those skilled in the art. Also, any of a number of well-known spring-type components can be used as the resilient member 16, rather than compressible spring washers. Further, rather than a separate piston 34 secured to the stud, the piston can be formed integrally with the stud. Additionally, the inventive closure mechanism can be employed in other environments, such as autoclaves or other pressure vessels. Therefore, the scope of the following claims is intended to be accorded the broadest reasonable interpretations so as to encompass all such modifications and equivalent structures and functions.

We claim:

1. A mechanism for selectively securing a cover to a flange of a pressure vessel, the cover and flange each having at least one opening therethrough, the openings being aligned when the cover is positioned facing the flange, the mechanism comprising:

an anchor plate movably supported adjacent to one of the cover and flange, the anchor plate having a hole therethrough, the hole having a wider portion and a narrower portion, the anchor plate being movable between a first position, in which the narrower portion of the hole is aligned with the openings of the cover and the flange, and a second position, in which the wider portion of the hole is aligned with the openings of the cover and the flange;

at least one piston secured to the other of the cover and flange so as to be slidable in a direction normal to the other of the cover and flange in alignment with the opening therethrough;

a stud extending from the piston and having a stud head remote from the piston so that the stud head is positioned on an opposite side of the flange and the cover from the piston when the cover is positioned facing the flange, the stud head being sized to fit longitudinally through the opening of at least the one of the cover and flange and through the wider portion of the hole of the anchor plate, the stud head being sized not to fit longitudinally through the narrower portion of the hole of the anchor plate;

a resilient member biasing the piston away from the other of the cover and flange so as to bias the stud head toward the one of the cover and flange;

a selectively activated actuator for overcoming the bias of the resilient member and forcing the piston toward the other of the cover and flange so that the stud head is moved away from the one of the cover and flange and the anchor plate; and positioning means for selectively moving the anchor plate between the first position, in which deactivating the actuator permits the resilient member to bias the stud head against the anchor plate to clamp the cover and flange together, and the second position, in which deactivating the actuator permits the resilient member to bias the stud head into the wider portion of the anchor plate hole so that the cover and flange can be separated by passing the stud head through the opening of the one of the cover and flange.

2. The mechanism of claim 1, wherein the selectively activated actuator comprises a stud-biasing hydraulic cylinder, in which the piston is slidably mounted, and means for introducing hydraulic fluid into the hydraulic cylinder.

3. The mechanism of claim 1, wherein the resilient member is a spring washer adjacent to the piston and through which the stud extends, the spring washer being disposed so as to be compressed when the piston is forced toward the cover.

4. The mechanism of claim 1, wherein the positioning means comprises a plate-positioning hydraulic cylinder secured to the anchor plate.

5. The mechanism of claim 1, wherein the anchor plate is substantially annular and rotatable circumferentially about the pressure vessel between the first and second positions.

6. The mechanism of claim 1, wherein the cover and flange have matching pluralities of the openings, the anchor plate has a corresponding plurality of the holes, and a corresponding plurality of the studs is provided.

7. The mechanism of claim 6, wherein a plurality of the pistons is provided, a respective one of the studs being secured to a different one of the pistons.

8. The mechanism of claim 7, wherein the selectively activated actuator includes a piston actuator that simultaneously engages more than one of the pistons.

9. The mechanism of claim 8, wherein the anchor plate and the piston actuator are substantially annular, and the piston actuator simultaneously engages all of the plural pistons.

10. A mechanism for selectively securing a cover to a flange of a pressure vessel, the cover and flange each having at least one opening therethrough, the respective openings being aligned when the cover is positioned facing the flange, the mechanism comprising:

a stud having a shank and a stud head at an end of the shank, the stud head being larger in cross section than the shank and sized to fit longitudinally through the opening of at least one of the cover and flange;

at least one piston disposed at an opposite end of the shank of the stud from the stud head, the piston being slidable substantially normal to the cover and flange and located so that the stud head and the piston are disposed on opposite sides of the cover and flange when the cover is positioned facing the flange, with the stud head being closer to the at least one of the cover and flange through which it fits;

an anchor plate disposed opposite to the cover and flange from the piston and having a hole therethrough into which the stud extends when the cover is positioned facing the flange, the hole having (i) a wider portion through which the stud head can pass longitudinally and (ii) a narrower portion through which the stud head cannot pass longitudinally, the anchor plate being movable between a first position, in which the narrower portion of the hole is aligned with the openings of the cover and flange, and a second position, in which the wider portion of the hole is aligned with the openings of the cover and flange;

a resilient member biasing the piston away from the cover and flange so as to bias the stud head toward the cover and flange;

a selectively activated actuator for overcoming the bias of the resilient member and forcing the piston toward the cover and flange so that the stud head moves away from the cover, the flange, and the anchor plate; and positioning means for selectively moving the anchor plate between (i) the first position, in which deactivating the actuator permits the resilient member to bias the stud head against the anchor plate to clamp the cover and flange together, and (ii) the second position, in which deactivating the actuator permits the resilient member to bias the stud head into the wider portion of the anchor plate hole so that the cover and flange can be separated by passing the stud head through the opening of the at least one of the cover and flange.

11. The mechanism of claim 10, wherein the actuator comprises a stud-biasing hydraulic cylinder, in which the piston is slidably mounted, and means for introducing hydraulic fluid into the hydraulic cylinder.

12. The mechanism of claim 10, wherein the resilient member comprises a spring washer adjacent to the piston and through which the stud shank extends, the spring washer being disposed so as to be compressed when the piston is forced toward the cover and flange.

13. The mechanism of claim 10, wherein the anchor plate is substantially annular and rotatable circumferentially about the pressure vessel between the first and second positions.

14. The mechanism of claim 10, wherein the positioning means comprises a plate-positioning hydraulic cylinder secured to the anchor plate.

15. The mechanism of claim 10, wherein the cover and flange have matching pluralities of the openings, the anchor plate has a corresponding plurality of the holes, and a corresponding plurality of studs is provided.

16. The mechanism of claim 15, wherein a plurality of the pistons is provided, each disposed at the opposite end of the shank of a different one of the studs.

17. The mechanism of claim 16, wherein the selectively activated actuator includes a piston actuator that simultaneously engages more than one of the pistons.

18. The mechanism of claim 17, wherein the pressure vessel and the cover are each substantially circular in cross section, the flange and the anchor plate are each substantially annular, the openings, the holes and the studs are distributed around the periphery of the pressure vessel, and the piston actuator is substantially annular and simultaneously engages all of the pistons.

19. A mechanism for selectively securing a cover to a flange of a pressure vessel, the cover and flange each having an opening therethrough, the respective openings being aligned when the cover is positioned facing the flange, the mechanism comprising:

a stud having a shank and a stud head at one end of the shank, the stud head being larger in cross section than the shank and sized to fit longitudinally through the opening of at least one of the cover and flange, and the stud being positionable with the stud head to a one side of the cover and flange closer to the at least one of the cover and flange through which the stud head can fit and with the shank extending from the other side of the cover and flange;

an anchor plate disposed on the one side of the cover and flange and having a hole therethrough into which the stud extends, the hole having (i) an enlarged portion through which the stud head can fit longitudinally and (ii) a narrowed portion through which the stud head cannot fit longitudinally, the anchor plate being movable between a first position, in which the narrowed portion of the hole is aligned with the openings of the cover and the flange, and a second position, in which the enlarged portion of the hole is aligned with the openings of the cover and the flange;

a piston disposed on the other side of the cover and flange at an end of the stud shank opposite from the stud head, the piston being selectively actuated to force the stud head away from the cover, the flange, and the anchor plate;

a resilient member biasing the piston away from the cover and flange so as to move the stud head toward the cover and flange when the piston is not actuated; and a drive mechanism that selectively moves the anchor plate between (i) the first position, in which the resilient member moves the stud head tightly against the anchor plate to clamp the cover and flange together when the piston is not actuated, and (ii) the second position, in which the resilient member moves the stud head into the enlarged portion of the hole of the anchor plate when the piston is not actuated so that the cover and flange can be separated by passing the stud head through the opening of the at least one of the cover and flange.

20. The mechanism of claim 19, wherein the piston is hydraulically actuated.

21. The mechanism of claim 19, wherein the drive mechanism is a hydraulic cylinder connected to the anchor plate.

22. The mechanism of claim 19, wherein the anchor plate is annular and rotatable circumferentially about the pressure vessel between the first and second positions.

23. A mechanism for selectively securing a cover to a flange of a pressure vessel, the cover and flange each having a series of openings therethrough, the openings of the cover being aligned with the openings of the flange when the cover is positioned facing the flange, the mechanism comprising:

an annular anchor plate rotatably supported by the vessel adjacent to the flange, the anchor plate having a series of holes therethrough, the holes each having a wider portion and a narrower portion, the wider portions and the narrower portions being alternately alignable with the openings through the cover and flange;

a plurality of pistons, each mounted opposite to the cover from the flange so as to be slidable in a direction substantially normal to the cover in alignment with a different one of the openings through the cover;

a plurality of studs, each extending from a different one of the pistons and having a stud head remote from the piston so that the stud heads are positioned opposite to the flange and cover from the pistons when the cover is positioned facing the flange, the stud heads being sized to fit longitudinally through the openings of the flange and through the wider portions of the holes of the anchor plate, the stud heads being sized not to fit longitudinally through the narrower portions of the holes of the anchor plate;

a plurality of spring washers, each adjacent to one of the pistons and having an associated one of the studs extending therethrough, so as to be compressed when the piston is forced toward the cover;

selectively activated means for applying hydraulic pressure to a distal side of each piston so as to force the pistons toward the cover and compress the spring washers so that the stud heads are moved away from the flange and the anchor plate; and positioning means for selectively moving the anchor plate between (i) a first position, in which the narrower portion of each of the holes is aligned with the openings of the cover and flange so that deactivating the hydraulic pressure permits the spring washers to decompress and bias the stud heads against the anchor plate to clamp the cover and flange together, and (ii) a second position, in which the wider portion of each of the holes is aligned with the openings of the cover and flange so that deactivating the hydraulic pressure permits the spring washers to decompress and bias the stud heads into the wider portions of the anchor plate holes so that the cover and the flange can be separated by passing the stud heads through the openings of the flange.

24. The mechanism of claim 23, wherein the positioning means comprises a plate-positioning hydraulic cylinder secured to the anchor plate.

25. The mechanism of claim 23, further comprising a plurality of collars extending through the aligned openings of the cover and flange, the collars each having an elongated bore through which one of the studs extends.

26. The mechanism of claim 23, wherein the selectively activated forcing means includes a piston actuator that simultaneously engages more than one of the plural pistons.

27. The mechanism of claim 26, wherein the piston actuator is substantially annular and simultaneously engages all of the plural pistons.

28. The mechanism of claim 23, wherein the pistons are each slidably mounted in a hydraulic cylinder that is secured to the cover.

29. The mechanism of claim 28, further comprising an elongated stop disposed within each cylinder so as to block the piston from travelling more than a predetermined distance toward the cover.

30. The mechanism of claim 29, wherein the stop is cylindrical and extends through the spring washer, and the stud extends through the stop.

31. The mechanism of claim 28, further comprising a spacer disposed between the cylinder and the cover.

32. The mechanism of claim 31, wherein the cylinder and spacer form an integral unit.

33. The mechanism of claim 31, wherein the spacer comprises a heat sink.

34. The mechanism of claim 33, wherein the heat sink comprises fins.

\* \* \* \* \*